United States Patent [19]

Binder

[11] Patent Number: 4,960,252
[45] Date of Patent: Oct. 2, 1990

[54] HOLDER FOR FASTENING AT LEAST ONE LONG ROUND BODY

[75] Inventor: Harmut Binder, Leonberg, Fed. Rep. of Germany

[73] Assignee: Dr. Ing. h.c.F. Porsche AG, Fed. Rep. of Germany

[21] Appl. No.: 373,443
[22] Filed: Jun. 30, 1989

[30] Foreign Application Priority Data

Jul. 1, 1988 [DE] Fed. Rep. of Germany ....... 3822374

[51] Int. Cl.⁵ ........................... F16L 5/00; H02G 3/22
[52] U.S. Cl. ................................. 248/56; 174/153 G
[58] Field of Search ............ 174/65 G, 152 G, 153 G; 16/2; 248/56

[56] References Cited

U.S. PATENT DOCUMENTS

| | | | |
|---|---|---|---|
| 1,820,696 | 8/1931 | Forshee | 174/152 G |
| 3,366,356 | 1/1968 | Fisher | 174/153 G X |
| 3,634,608 | 1/1972 | Buhl et al. | 174/153 G |
| 3,918,667 | 11/1975 | Madden | 248/56 |
| 4,289,923 | 9/1981 | Ebert | 174/65 G |
| 4,640,479 | 2/1987 | Shely et al. | 174/153 G X |

FOREIGN PATENT DOCUMENTS

| | | |
|---|---|---|
| 2155231 | 5/1973 | Fed. Rep. of Germany ... 174/153 G |
| 3106794 | 9/1982 | Fed. Rep. of Germany . |
| 3524278 | 1/1987 | Fed. Rep. of Germany ........ 248/56 |

*Primary Examiner*—Laramie E. Askin
*Attorney, Agent, or Firm*—Evenson, Wands, Edwards, Lenahan & McKeown

[57] ABSTRACT

A fastening arrangement for a holder of a round body on a supporting part includes a slotted opening arranged on a wall of the supporting part. The holder is slidable into this slotted opening after reaching around the round body to be fastened. A receiving section is provided at the circumference of the holder to reach around the wall of the supporting part on both sides for positioning the holder on the supporting part.

7 Claims, 3 Drawing Sheets

HOLDER FOR FASTENING AT LEAST ONE LONG ROUND BODY

BACKGROUND AND SUMMARY OF THE INVENTION

The invention relates to a holder for fastening at least one long round body such as a cable, a line, a hose or the like, and having two halves surrounding the round body, to be fastened. These halves are connected to one another at one of their end areas by means of a film joint hinge The holder has fastening devices for securing at an adjacent stationary supporting wall.

A known holder of the initially mentioned type (DE-PS 31 06 794) consists of two halves which, at their one end area, are connected with one another by means of a film joint hinge. After the inserting of the long round body (such as a cable), the two halves are folded together, whereby snap connection elements of the two halves interact with one another and thus fasten the round body. For fastening the holder to a stationary supporting part, a threaded stem is arranged at the supporting part. The holder is fitted onto this threaded stem. Adjacent to the film joint hinge, the holder has an opening formed by grooves of the two halves, the two grooves being provided with threads.

This holder has the disadvantage that in fastening the two halves in their closed position, special snap connection elements must be provided on both halves, which makes the manufacturing of the holder more expensive. In addition, costly measures (grooves with threads; threaded stems, etc.) must be taken at the holder and the supporting part for the fastening of the holder to the supporting part.

It is an object of this invention to provide a holder and a supporting part with a simple construction as well as to provide a secure fastening at the supporting part.

According to the invention, this object is achieved by having one wall of the supporting part have a slotted opening that is arranged to open in a slide-in direction of the holder. After the holder has reached around the round body, it is slid into this slotted opening, wherein a receiving section, which, at least in sections, is provided at the circumference of the holder, reaches around the wall of the supporting part on both sides thereof to secure the holder thereto.

It is advantageous if the receiving section is profiled approximately in a U-shape, wherein two legs of the U-shape accommodate the wall between them, and wherein the open side of the U-shape faces an edge of the slotted opening. The slotted opening means is long as viewed in the slide-in direction of the holder and tapers continuously towards a semicircular end area. The receiving section of the holder is formed with projections on a circumference, wherein these projections are molded to the holder on both sides thereof, and wherein the projections of both sides are displaced along the holder with respect to one another.

When the holder is slid into the opening, a bottom of the receiving section supports itself at the slotted opening, whereby the two halves of the holder are automatically moved into a tightly closed position. There are additional fasteners for the holder at the wall which includes detent openings in the wall cooperating with tongue-shaped detents on the holder. The two detents are molded on opposite projections of the holder and have a square or other rectangular shape. The two halves of the holder interconnect by a plug in connection at an end area thereon which faces away from the film joint hinge.

A main advantage achieved by the invention is that by means of the arrangement of a slotted opening at the supporting part which is open in the slide-in direction, and by means of the arrangement of a receiving section on the side of the circumference of the holder, a holder is provided which has a simple construction and can be mounted and demounted rapidly and reliably at the supporting part. By means of the sliding-in of the holder, the bottom of the receiving section interacts with the slotted opening and the two halves are automatically moved into their closed position and remain in this position. The development of snap connection elements at the end area of the holder facing away from the film joint hinge is therefore not necessary. By means of the alternating arrangement of the projections forming the receiving section, manufacturing costs are reduced, because no additional slider is required. Detents, which are locally shaped onto the projections and which engage in corresponding detent openings of the supporting part, cause an additional fastening of the holder at the supporting part. The holder has a simple construction, can be manufactured cost-effectively and can be mounted in a rapid and simple manner.

Other objects, advantages and novel features of the present invention will become apparent from the following detailed description of the invention when considered in conjunction with the accompanying drawings.

DETAILED DESCRIPTION OF DRAWINGS

Figure 1:
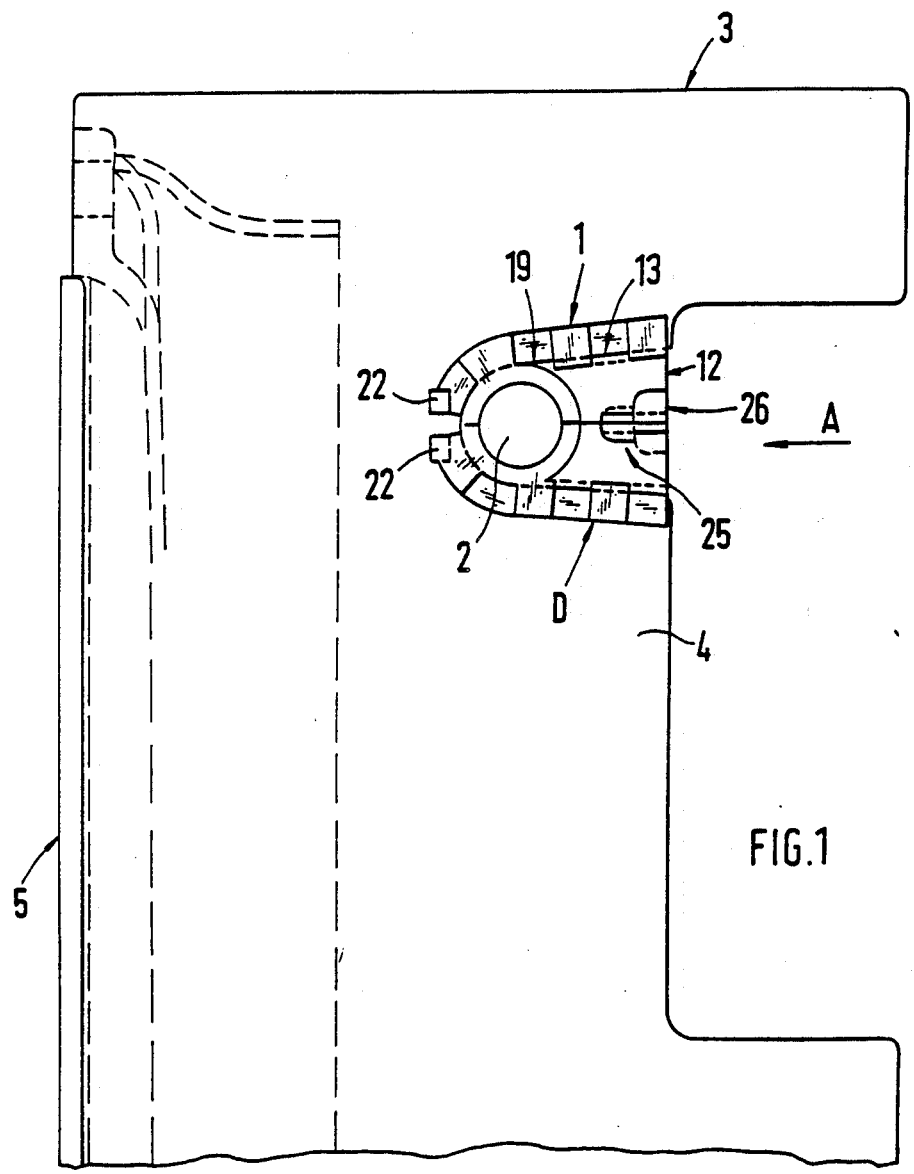
FIG. 1 is a lateral view of a stationary supporting part with an inserted holder.

In FIG. 1, a holder 1 is shown for the fastening of at least one long round body 2, the holder 1 being held in position at an adjacent stationary supporting part 3.

The long round body 2 may be a cable, a line, a pipe, a hose or the like. In the embodiment, the supporting part 3 is formed by an upright extending wall 4 of an air-conditioning casing 5 which extends in the longitudinal direction of a vehicle. In this case, the round body 2 extends transversely with respect to the longitudinal direction of the vehicle. The wall 4 may be made of a plastic material or of metal and may take up any position.

Figure 2:
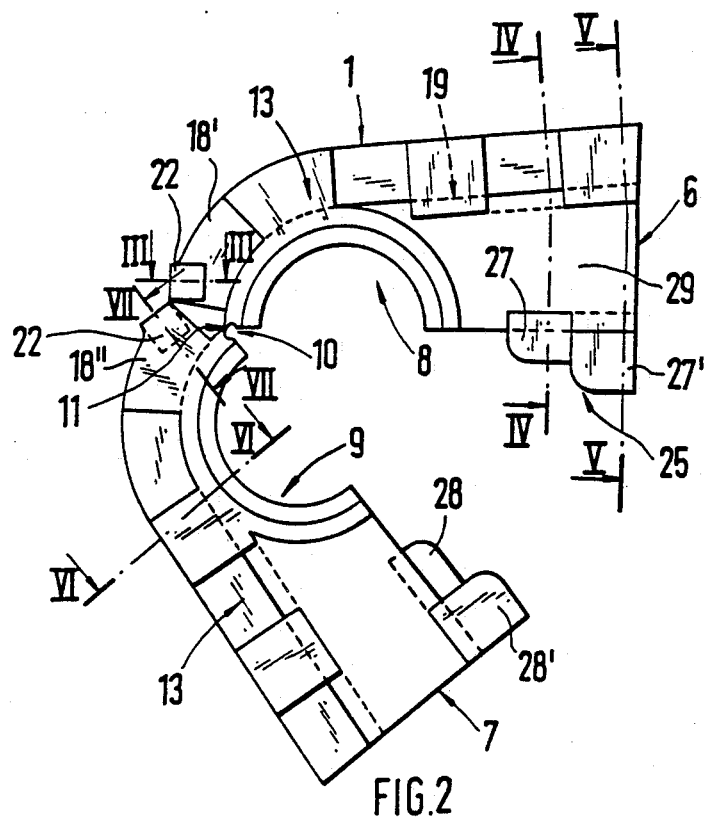
FIG. 2 is an enlarged lateral view of the holder in its folded-open position.
Figure 8:
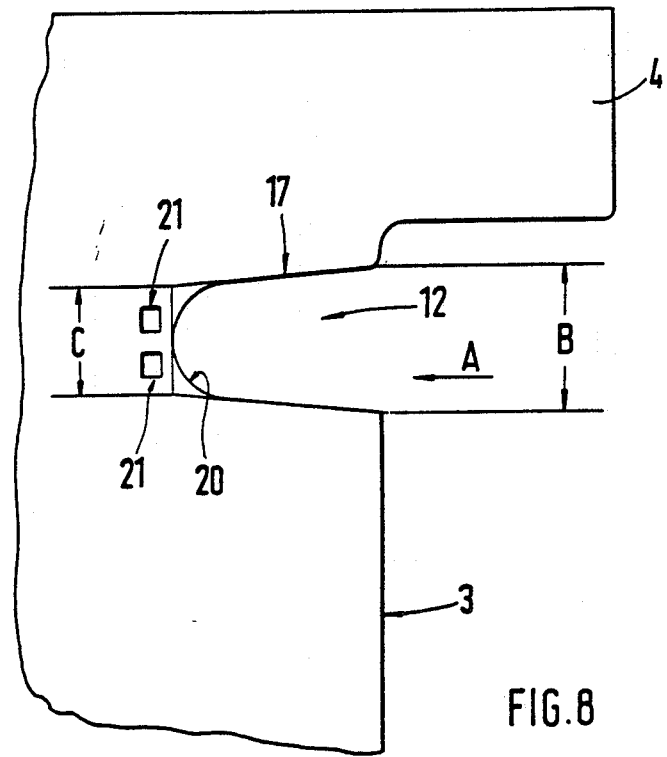
FIG. 8 is a lateral view of the supporting part with the slotted opening.

The holder 1, which preferably is made from a suitable plastic material, comprises two halves 6, 7 with respectively semicircular recesses 8, 9 for the guiding-through of the round body 2 (FIG. 2). At one of their end areas, the two halves 6, 7 are connected with one another by means of a film joint hinge 11. For fastening of the holder 1, a long slotted opening 12 (FIG. 8) is arranged in the wall 4 which opening accommodates the holder in the slide-in direction A of the holder 1. After being placed around the round body 2, the holder 1 can be slid into this slotted opening 12 (FIG. 8).

Figure 4:
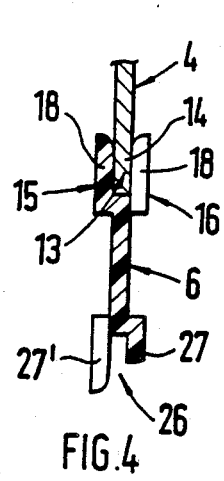
FIG. 4 is a sectional view according to Line IV—IV of FIG. 2.
Figure 5:
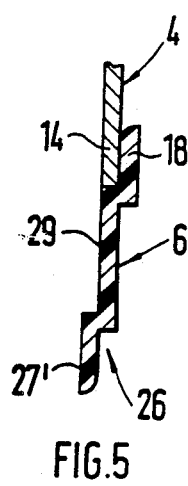
FIG. 5 is a sectional view according to Line V—V of FIG. 2.
Figure 6:
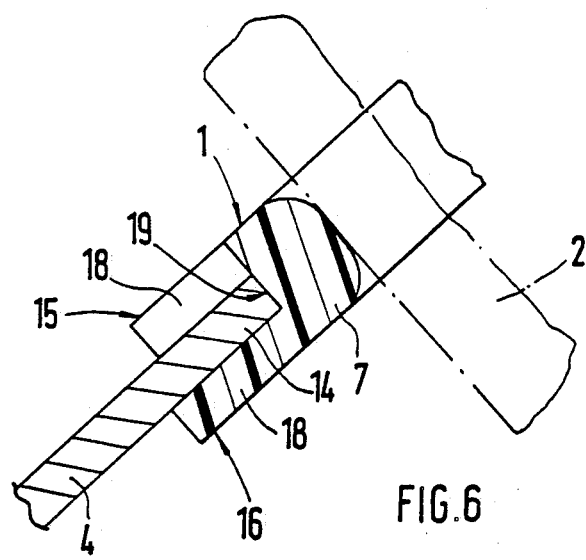
FIG. 6 is an enlarged sectional view according to Line VI—VI of FIG. 2.

For fastening of the holder 1 at the wall 4, the holder 1 has a receiving section 13 on its circumference. The holder extends around the edge 14 of the slotted opening or the wall 4 of the supporting part 3 on both sides thereof. The receiving section 13—in cross-sectional view—is profiled in an approximate U-shape (FIG. 4), having two upright legs 15, 16 being spaced from one another along the edge 14 of the wall 4 so that the edge can be easily accommodated between them. The open side of the U-shaped receiving section 13 faces a border 17 of the edge 14 of the slotted opening 12.

The legs 15, 16 may be constructed continuously at both sides of the wall 4. According to FIG. 1, the two legs 15, 16 are formed by projections 18 on the circumference side of the holder 1 in which case the local projections 18 are molded to the holder 1 and alternately displaced to both sides of the wall 4. The bottom or yoke 19 at the U-shaped receiving section 13 supports itself at the outer bordering edge 17 of the slotted opening 12 when the holder 1 is mounted. In this condition both halves 6, 7 of the holder 1 are automatically pressed against one another and take up their closed position D (FIG. 1). The shape of the bottom 19 is adapted to the contour of the border 17 of the slotted opening 12.

The long slotted opening 12 has its largest width B in the area of its open side and subsequently tapers, viewed in the slide-in direction A of the holder 1, continuously to its semicircular end area 20 which has a width equal to the measurement C.

For the additional fastening of the holder 1 at the supporting part 3, detent openings 21 are provided at the wall 4. Tongue-shaped detents 22 of the holder 1 engage into these openings 21. According to FIG. 8, two aligned detent openings 21, located above one another, are provided at the wall 4 outside the slotted opening 12. These detent openings 21 having a square shape in the, embodiment. However, the detent openings 21 may also be rectangular other than square, triangular, round or the like.

Figure 3:
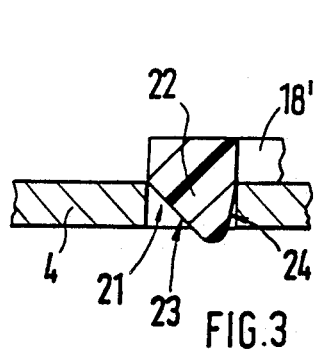
FIG. 3 is an enlarged sectional view according to Line III—III of FIG. 2.
Figure 7:
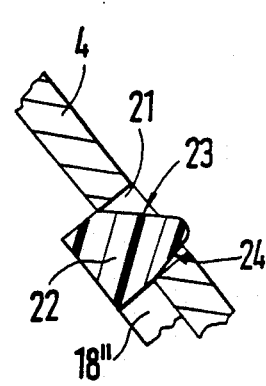
FIG. 7 is an enlarged sectional view according to Line VII—VII of FIG. 2.

The detents 22 are molded to the projections 18', 18" which are arranged on both sides of the film joint hinge 11. Thus, each detent 22 is located on another side of the wall 4. For an easier mounting, the detents 22 have stopping slopes 23, 24 (FIGS. 3 and 7). The detents 22 penetrate the detent openings 21 and project slightly on the opposite side of the wall 4 (FIGS. 3 and 7).

On the end area 25 of the holder 1, which faces away from the film joint hinge 11, the two halves 6, 7 interact by means of a plug-in connection 26. For this reason, two tongues 27, 27' and 28, 28' respectively are molded on one holder half 6 as well as on the other holder half 7. These tongues are displaced with respect to one another, the tongues 27, 27' and 28, 28' of each half 6, 7 extending on opposite sides of a vertical wall 29 of the holder 1. The two tongues 27, 27' of half 6 and the tongues 28, 28' of half 7 are displaced with respect to one another. The holder 1 may naturally also have several recesses 8, 9 for receiving the round bodies 2 which are preferably arranged next to one another.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An arrangement for holding at least one long round body, comprising:
 a stationary supporting part having a wall with a slotted opening for longitudinally slidably receiving a holder, the slotted opening tapering continuously towards a semicircular end area viewed in a longitudinal slide-in direction, said wall having at least one detent opening; and
 a holder having:
 two holder halves for surrounding the round body, each holder half having first and second end areas, and at least one of the two holder halves having a detent that engages the detent opening when the holder is slidably received in the slotted opening;
 a film joint hinge connecting the two holder halves together at the first end areas;
 a plug-in coupling that couples the two holder halves at the second end areas; and
 a receiving section at a circumference of the holder, the receiving section extending on two sides of said wall.

2. The arrangement according to claim 1,
 wherein the receiving section is profiled approximately in a U-shape;
 wherein two legs of the U-shape of the receiving section accommodates the wall between them; and
 wherein the open side of the U-shaped receiving section faces an edge of the slotted opening.

3. The arrangement according to claim 1, wherein the receiving section of the holder includes projections on a circumference, these projections being molded to the holder on both sides thereof, wherein the projections of both sides are displaced along the holder with respect to one another.

4. The arrangement according to claim 1, wherein the receiving section has a bottom that supports itself at the slotted opening such that the two holder halves are automatically moved into a tightly closed position when the holder is slidably received in the slotted opening.

5. The arrangement according to claim 1, wherein said wall has two detent openings and each holder half has a detent, said detents being on opposite sides of the holder.

6. The arrangement according to claim 1, wherein the detent opening has a rectangular shape.

7. The arrangement according to claim 6, wherein the rectangular shape is square.

* * * * *